United States Patent Office.

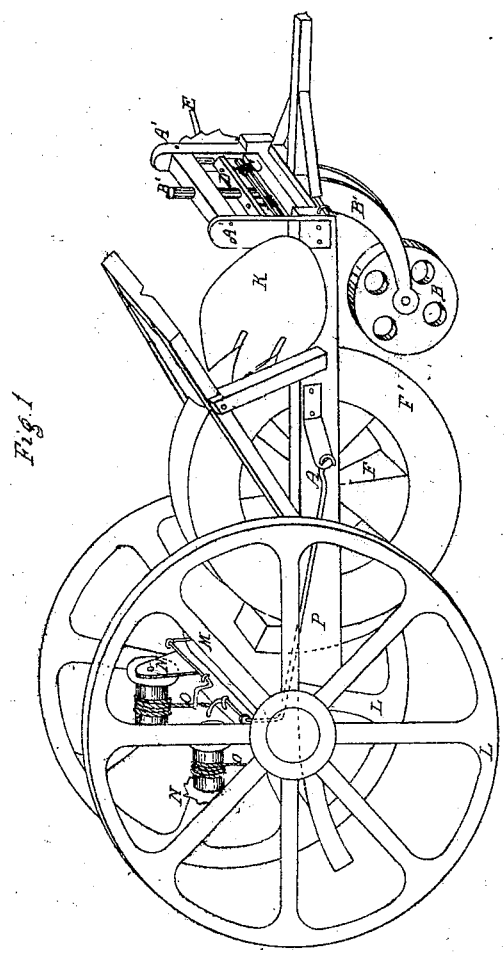

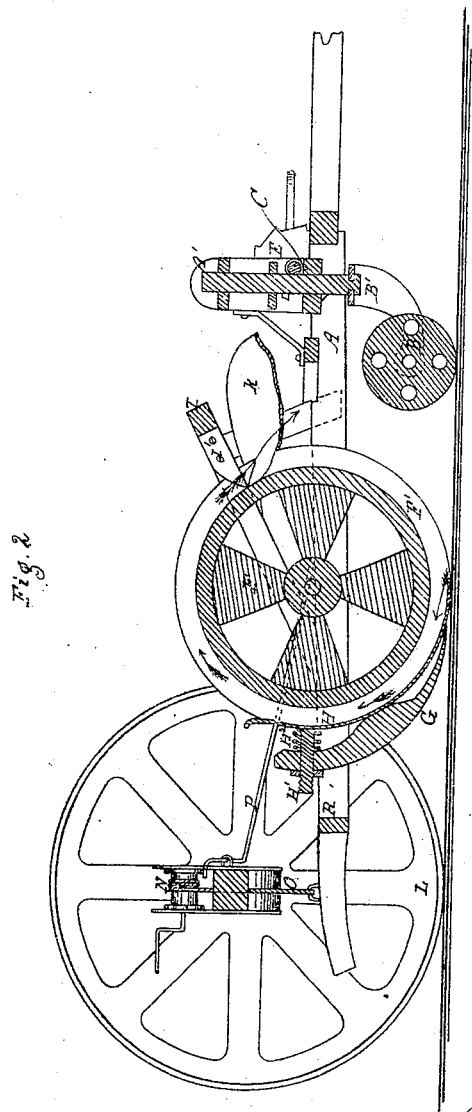

CLEMENS BYMER AND JOHN IMLAY, OF GREENSBURG, INDIANA.

Letters Patent No. 71,275, dated November 26, 1867.

---

IMPROVEMENT IN DITCHING-MACHINE.

---

The Schedule referred to in these Letters Patent and making part of the same.

---

TO ALL WHOM IT MAY CONCERN:

Be it known that we, CLEMENS BYMER and JOHN IMLAY, of Greensburg, in the county of Decatur, and State of Indiana, have invented a new and useful Improved Ditching-Machine; and we do hereby declare that the following is a full, clear, and exact description of the same, reference being had to the annexed drawings, making part of this specification, in which—

Figure 1 is a perspective view, and

Figure 2 is a vertical longitudinal section.

The same letters are employed in both figures in the indication of identical parts.

A is the main frame, on the front of which are vertical standards, A', with horizontal cross-pieces, through which passes the stem B', which is bifurcated below the frame, to form bearings on each side for the axle of the caster-wheel B, which supports the front end of the frame. A swell on the stem sustains the cross-head D, from which the frame is adjustably suspended upon ropes passing around the axle C, which is turned by a crank, and held in position to sustain the frame by the ratchet-wheel E and pawl working on the same. F is a wheel, the axle of which has its bearings in the main frame. It is constructed with flanges, F', on each side, sharp on the edges, and forming a groove to receive the earth cut by the flanges F' on each side of the wheel. The plough G, attached to the main frame, projects under the wheel F, between the flanges F', and, being sharp on the edge, it cuts the earth below and between the flanges. The earth thus separated is carried between the wheel and plough upwards, until it reaches the plate H, placed between the flanges, and hinged to the plough. A stem, $H^1$, is surrounded by a spiral spring, $H^2$, which, resting against the frame or plough, presses the plate H against the earth thus raised, packing it against the wheel and between the flanges, sufficiently to retain it in place while being carried over the wheel. I is a brace extending from the frame, and supporting the side cutters I', which, extending downwards near each flange, separate the earth from the flanges. The scraper and conveyer K has a lip carried between the flanges, and so formed as, passing under the earth, to separate the latter from the wheel, and cause it to fall, sliding down the conveyer and falling on one side of the machine. The rear of the frame is suspended from the wheels L and axle M by ropes O, attached to the axles N, which, resting upon the axle, are turned by cranks, and also provided with ratchet-wheels and pawls, to sustain the load. The rods P are attached to the main frame, and also to the axle, in such manner as to permit the frame to be raised or depressed in the manner already described. The frame may be thus gradually lowered as the ditch is deepened, the wheels L running on the sides of the ditch, and outside the earth deposited by the conveyer.

What we claim as our invention, and desire to secure by Letters Patent, is—

1. The wheel F, with side flanges F', and plough G, in combination with the adjustable compressing-plate H, and spring $H^2$, substantially as described.

2. The combination of the wheel F with side flanges F', and the side cutters I', substantially as described.

3. The combination of the wheel F with side flanges F', the side cutters I', and the scraper and conveyer K, substantially as described.

4. The combination of the frame A, caster-wheel B, and the adjusting mechanism, consisting of the parts C, D, and E, substantially as set forth.

5. The combination of the frame A, wheels L, and axle M, with the hinged rods P, and the adjusting mechanism, consisting of the parts O and N, substantially as set forth.

In testimony whereof we have signed our names to this specification in the presence of two subscribing witnesses.

CLEMENS BYMER,
JOHN IMLAY.

Witnesses:
THOMAS DOLES,
PETER TRUE.